US008518343B2

(12) United States Patent
Gumbrecht et al.

(10) Patent No.: US 8,518,343 B2
(45) Date of Patent: Aug. 27, 2013

(54) METHOD FOR THE PRODUCTION OF A SOLUTION, ASSOCIATED ARRANGEMENT AND USES OF THE METHOD AND ARRANGEMENT

(75) Inventors: Walter Gumbrecht, Herzogenaurach (DE); Peter Paulicka, Erlangen (DE); Manfred Stanzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 679 days.

(21) Appl. No.: 11/587,572

(22) PCT Filed: Apr. 26, 2005

(86) PCT No.: PCT/EP2005/051870
§ 371 (c)(1), (2), (4) Date: Oct. 25, 2006

(87) PCT Pub. No.: WO2005/105284
PCT Pub. Date: Nov. 10, 2005

(65) Prior Publication Data

US 2007/0212708 A1 Sep. 13, 2007

(30) Foreign Application Priority Data

Apr. 30, 2004 (DE) ......................... 10 2004 021 821

(51) Int. Cl.
*G01N 21/75* (2006.01)

(52) U.S. Cl.
USPC ........... 422/425; 422/255; 422/409; 422/417; 436/166; 436/174

(58) Field of Classification Search
None
See application file for complete search history.

(56) References Cited

U.S. PATENT DOCUMENTS

| | | | |
|---|---|---|---|
| 1,572,323 | A | 2/1926 | Smith |
| 1,603,877 | A | 10/1926 | Smith |
| 5,096,669 | A | 3/1992 | Lauks et al. |
| 2002/0187560 | A1 | 12/2002 | Pezzuto et al. |
| 2004/0171170 | A1 | 9/2004 | Sandell |

FOREIGN PATENT DOCUMENTS

| | | | |
|---|---|---|---|
| DE | 689 24 782 | T2 | 3/1990 |
| EP | 0 434 742 | B1 | 11/1995 |
| WO | WO 02/072262 | A1 | 9/2002 |

OTHER PUBLICATIONS

Rudi, K., et al., Rapid, Universal method to isolate PCR-ready DNA using magnetic beads, Bio Techniques, 1997, vol. 22(3), pp. 506-511.*

Turov, V. D., et al., Organic media for the protection of powders of the compound SmCo5 against oxidation, 1976, Test methods and properties of materials, Plenum Pulishing Corporation.*

* cited by examiner

*Primary Examiner* — Robert Xu

(74) *Attorney, Agent, or Firm* — Harness, Dickey & Pierce, P.L.C.

(57) ABSTRACT

Solid matter in a cavity is used to produce a solution of at least one solid matter in a solvent. The solid matter which is soluble in the solvent in initially covered and/or surrounded in the cavity by a medium which is insoluble in a solvent, such that dissolving of the solid matter is prevented. Subsequently the solvent is guided to the cavity and the medium which is insoluble in the solvent is treated in such a manner that contact is made between the solvent and the soluble solid matter, enabling the solid matter to dissolve in the solvent. Solutions including two or more solid matter can be produced in an advantageous manner.

31 Claims, 1 Drawing Sheet

1
2
3
3'
5
6
7
8
17
18
19
61
61'

METHOD FOR THE PRODUCTION OF A SOLUTION, ASSOCIATED ARRANGEMENT AND USES OF THE METHOD AND ARRANGEMENT

PRIORITY STATEMENT

This application is the national phase under 35 U.S.C. §371 of PCT International Application No. PCT/EP2005/051870 which has an International filing date of Apr. 26, 2005, which designated the United States of America and which claims priority on German Patent Application number 10 2004 021 821.8 filed Apr. 30, 2004, the entire contents of which are hereby incorporated herein by reference.

FIELD

The invention generally relates to a method and/or associated arrangement for the production of a solution from at least one solid matter in a solvent. In addition, the invention also generally relates to uses of the arrangement and/or the method, for example in chemical analyses.

BACKGROUND

In biomedical technology there is a requirement for solid matters to be dissolved in a solvent. Such solid matters are for example reagents that are stored as a dry mixture with negligible vapor pressure and form a stable substance at room temperature. Only when needed are they dissolved for the intended use in analysis.

A device of this type is described for example in WO 02/072262 A1. In particular, an analysis device in which dry reagents are stored as solid matters and when needed are dissolved in a solvent is formed there as an easy-to-handle chip card.

If the actual intended use of the dry reagents is preceded by rinsing steps and other measures, it is required that dissolving of the solid matter which is soluble in the solvent is initially prevented and that the solution of a precisely defined composition and quantity to be set is only produced when it is needed. This is the case in particular with the PCR reaction (Polymerase Chain Reaction), in which the PCR reagent initially has to be protected in the reaction chamber and is only to be released after the DNA has been supplied, concentrated and purified.

In the case of the analysis device according to WO 02/072262 A1, for use in biochemical analysis the dry reagents present in the chip card can be stored already in a pre-measured and pre-portioned form for the analysis. In this case, a solution with a precisely defined amount of reagent is produced in conjunction with a solvent from a prepared reservoir of the pre-portioned reagents. Furthermore, EP 0 434 742 B1 discloses a disposable detector arrangement for real-time liquid analysis in which a liquid sample is automatically analyzed by use of a disposable sensor and the associated measured values are output. The important aspect here is that the analysis reagent is kept ready as a liquid.

For medical applications, U.S. Pat. Nos. 1,572,323 A and 1,603,877 also disclose sample containers which contain a liquid in a closed system and, initially separate from it, reagents. The solid reagents can be dissolved in the liquid by suitable measures. Furthermore, US 2002/0187560 A1 discloses a microfluidic device which is suitable for combining discrete volumes of liquid with one another in channels and supplying them to a sample chamber. In this case, the actuation of these microfluidic devices may take place pneumatically or magnetically. Furthermore, US 2004/0171170 A1, which is not a prior publication, discloses a device with a multiplicity of cavities of which two types of cavities respectively can be charged in parallel with volumes of liquid. Thus, individual microcavities are respectively connected separately via fluid channels to a liquid reservoir.

On the basis of the latter prior art, the object of the invention is to propose a method by which especially solid matters can be brought specifically into solution, and to specify associated uses. Furthermore, an associated arrangement is to be provided.

SUMMARY

At least one embodiment of the invention can be used for the specific production of a solution from at least one solid matter in a solvent. It is advantageous in this case, in at least one embodiment, that this operation can take place in a closed unit and that the solid matter is kept in this unit.

In the case of at least one embodiment of the invention, the first solid matter is for example a PCR reagent. A second solid matter, on the other hand, may be isolated DNA. As is known, DNA of this type may be adsorbed on so-called magnetic beads which are suspended in the solvent. They are enriched in a channel or a cavity, in which a PCR is intended to take place.

At least one embodiment of the invention may therefore, for example, be used for carrying out PCR. However, other analytical uses in which solid matters are prepared and dissolved when needed are possible.

BRIEF DESCRIPTION OF THE DRAWINGS

Further advantages and details of the invention emerge from the following description of figures on the basis of the example embodiments in conjunction with the patent claims. In the drawings:

DETAILED DESCRIPTION OF THE EXAMPLE EMBODIMENTS

Figures 1, 2, 3, 4, 5:
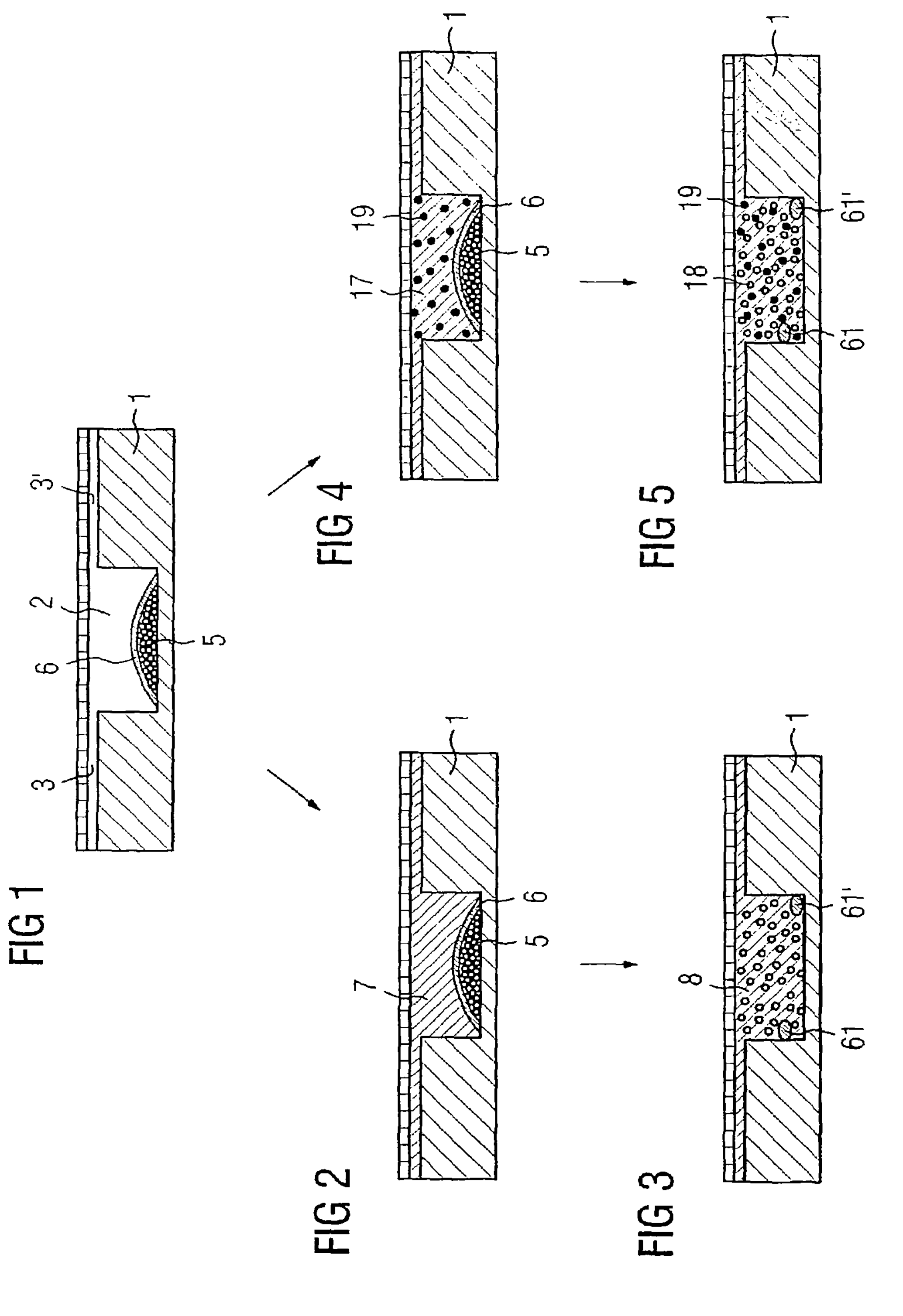
FIG. 1 shows in section a container with a cavity in which a first solid matter is stored.
FIGS. 2 and 3 show two functional steps of the device according to FIG. 1 when working with a solid matter and associated solvent and FIGS. 4 and 5 show two functional steps when working with a device according to FIG. 1 with two solid matters and associated solvent.

In the figures, an analysis unit is denoted by 1. This unit is a so-called cartridge body, which may be part of a portable device.

In the cartridge body 1 there is a cavity 2, in which specific reactions can take place. There are fluidic channels, from which a first channel 3 leads to the cavity 2 and a second channel 3' leads away from the cavity 2.

The cavity 2 may be closed by a cartridge closure 4 that is not shown. Valves or the like may be present, allowing the fluidic channels 3 and 3' to be closed at a suitable point.

In the cavity 2, a first solid matter 5 is stored. The solid matter 5 is a reagent or a mixture of reagents, the mixture forming a stable substance at room temperature. The solid matter 5 forms a layer on the bottom of the cavity 2. The surface of the solid matter 5 is protected by a medium 6, which forms a thin film on the layer of solid matter 5. The medium 6 is not soluble in the solvent in which the solid matter 5 is to be dissolved.

Paraffin, which is not soluble even in an aqueous solvent, may be advantageously used as the medium 6. Other media that are insoluble in the solvent are also possible. Instead of a thin film which draws over the first solid matter largely two-dimensionally, a three-dimensional enclosure of solid matter particles, for example spherical particles, which are immobilized in the cavity, may also be used.

In FIG. 2 it is shown that a solvent 7 flows through the fluidic channel 3 and fills the cavity, or flows through it. The solid matter 5 protected by the medium 6 remains untouched by the solvent.

Since the protecting medium 6 is particularly paraffin, it can be dissolved by heating. This is represented in FIG. 3. After the paraffin has dissolved, the medium 6 no longer has any protective function. It forms for example individual beads, which are indicated as 61 and 61'. The solid matter, on the other hand, has gone over into solution or into suspension 8, so that the dissolved reagent is in the cavity 2, ready to be used for further purposes.

In FIG. 4, which otherwise corresponds to FIG. 2, such a solvent 17, which contains a second solid matter 19, has been introduced into the cavity 2.

The first solid matter 5 is protected in FIG. 4 in a way corresponding to FIG. 1/2 by the medium 6. The second solid matter 19 is either dissolved in the solvent or in the form of a suspension. Instead of a second solid matter, a liquid substance may also be dissolved or present as an emulsion in the solvent.

After heating and dissolving of the paraffin, the medium 6 no longer has any protective function. In FIG. 5, beads 61 and 61' of the medium are once again formed in a way corresponding to FIG. 3. A solution or suspension 18 is then formed from the solvent 17 with the first solid matter 5 and the second solid matter 19 and is available for further uses. If the so-called second solid matter is a liquid, an emulsion is correspondingly produced.

The first and second solid matter (or liquid) may be chosen such that, after removal of the protective medium, they can react with one another and if appropriate can change their properties, such as solubilities for example.

If the first solid matter is a PCR reagent and the second solid matter is DNA, PCR reactions can take place in the cavity. Suitable materials/things for thermocycling are necessary for this. Paraffin is particularly well-suited here as the protective medium, since in PCR a first heating-up operation is required in any case and the protective paraffin layer dissolves during this. It is consequently also advantageous to implement a so-called “hot-start” PCR, which prevents the PCR enzyme polymerase from already becoming active unspecifically, and consequently disadvantageously, below a certain temperature (paraffin dissolving temperature).

The DNA as the second solid matter is usually bonded to so-called magnetic beads and is consequently in the form of a suspension. The DNA bonded to magnetic beads can be collected and brought specifically into the cavity 2 by using magnetic devices.

Methods of embodiments described above and the associated device are suitable in a particular way for carrying out PCR. However, embodiments of the invention can also be used for other applications in biomedical technology, in particular whenever quantitative solutions of individual dry reagents are to be formed at specific points in time, in particular immediately before an analysis that is to be carried out. An enzyme label solution, an enzyme substrate solution or general calibrating solutions may be mentioned as examples of the production of defined reagent solutions.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed:

1. A method for the production of a solution from at least one solid matter in a solvent, the solvent being supplied to a single cavity from a reservoir via a single microchannel, the method comprising:

storing the at least one solid matter, soluble in the solvent, in the single cavity in a solid state by receiving the at least one solid matter through the single microchannel or the single cavity;

introducing a medium in the single cavity, wherein the medium is paraffm that is insoluble in the solvent, and wherein the medium covers or encloses the at least one solid matter so that dissolution of the solid matter which is soluble in the solvent is prevented;

rinsing the single cavity by allowing a rinsing agent to flow through the single microchannel;

supplying the solvent, through the single microchannel, to the single cavity in which the at least one solid matter is stored; and treating the medium, which is insoluble in the solvent, in such a way that contact between the solvent and the soluble solid matter, and consequently dissolving of the solid matter, which is in the solid state, in the solvent, occurs and the solution is produced.

2. The method as claimed in claim 1, wherein two solid matters are present, the first solid matter being kept in the cavity and the second solid matter being contained in the solvent, and at least one of the first solid matter, which is soluble in the solvent, is at least one of covered and enclosed in the cavity with the medium which is insoluble in the solvent, so that dissolving of the first solid matter which is soluble in the solvent is prevented; and the second solid matter contained in the solvent is supplied to the cavity.

3. The method as claimed in claim 1, wherein the method is performed using a fully integrated single-use unit, in which the at least one solid matter is kept in the cavity.

4. The method as claimed in claim 1, wherein the cavity is closed by valves.

5. The method as claimed in claim 1, wherein water is used as the solvent.

6. The method as claimed in claim 2, wherein the second solid matter is suspended in the solvent.

7. The method as claimed in claim 1, wherein the first solid matter is a PCR reagent.

8. The method as claimed in claim 7, wherein the PCR reagent includes polymerases, nucleotides, primers, buffers and adjuvants.

9. The method as claimed in claim 8, wherein the PCR reagent forms a film on the wall of the cavity.

10. The method as claimed in claim 2, wherein the second solid matter is at least one of dissolved and suspended DNA to be amplified.

11. The method as claimed in claim 10, wherein DNA to be amplified are bonded to magnetic beads.

12. The method as claimed in claim 11, wherein the cavity is a PCR cavity, and the PCR cavity includes means for collecting the magnetic beads.

13. A disposable product, comprising:

one microchannel configured to receive both a solvent and at least one solid matter which is soluble in the solvent; and a cavity configured to receive and store the at least one solid matter, the at least the one solid matter being stored on a wall of the cavity and covered by a thin layer of a medium which is not soluble in the solvent, wherein the medium, which is paraffin that is insoluble in the solvent, is treatable in such a way to permit contact between the solvent and the soluble solid matter, and consequently dissolving of the solid matter, which is in the solid state, in the solvent when a rinsing agent is introduced, to produce a solution.

14. The disposable product as claimed in claim 13, wherein the solvent is supplied to the cavity from a reservoir via the one microcharmel, the cavity being a PCR cavity suitable for thermocycling.

15. The disposable product as claimed in claim 14, further comprising means for thermocycling.

16. The disposable product as claimed in claim 14, wherein the PCR cavity is equipped with an inflow and an outflow.

17. The disposable product as claimed in claim 14, wherein the inflow and the outflow are equipped with valves.

18. A method, comprising:

using the disposable product as claimed in claim 13 in PCR (Polymerase Chain Reaction) for biochemical analyses.

19. The method as claimed in claim 2, wherein the method is performed using a fully integrated single-use unit, in which the at least one solid matter is kept in the cavity.

20. The method as claimed in claim 2, wherein the cavity is closed by valves.

21. The method as claimed in claim 2, wherein water is used as the solvent.

22. The method as claimed in claim 2, wherein the first solid matter is a PCR reagent.

23. The method as claimed in claim 22, wherein the PCR reagent includes polymerases, nucleotides, primers, buffers and adjuvants.

24. The method as claimed in claim 23, wherein the PCR reagent forms a film on the wall of the cavity.

25. The method as claimed in claim 6, wherein the second solid matter is at least one of dissolved and suspended DNA to be amplified.

26. An arrangement, comprising the disposable product of claim 13, wherein the arrangement produces the solution from the at least one solid matter in the solvent, the solvent being supplied to the cavity from the reservoir via the one microchannel.

27. An arrangement, comprising the disposable product of claim 14, wherein the arrangement produces the solution from the at least one solid matter in the solvent.

28. The method as claimed in claim 1, wherein treating the medium includes dissolving or forming an emulsion.

29. The method as claimed in claim 1, wherein treating the medium involves forming an emulsion wherein the medium is in the form of a suspension in the solvent.

30. The disposable product as claimed in claim 13, wherein the medium is either dissolved in the solvent or a suspension in the solvent, when treated.

31. The disposable product as claimed in claim 13, wherein the medium is a suspension in the solvent when treated.

* * * * *